(No Model.)

J. L. POWLES.
DRAFT EQUALIZER.

No. 422,154. Patented Feb. 25, 1890.

WITNESSES:
John M. Weemer
C. Sedgwick

INVENTOR:
J. L. Powles
BY Munn & Co.
ATTORNEYS.

UNITED STATES PATENT OFFICE.

JOHN L. POWLES, OF GOODLAND, INDIANA.

DRAFT-EQUALIZER.

SPECIFICATION forming part of Letters Patent No. 422,154, dated February 25, 1890.

Application filed December 2, 1889. Serial No. 332,310. (No model.)

*To all whom it may concern:*

Be it known that I, JOHN L. POWLES, of Goodland, in the county of Newton and State of Indiana, have invented a new and useful Improvement in Draft-Equalizers, of which the following is a full, clear, and exact description.

This invention relates to draft-equalizers intended for four horses abreast—that is, three on one side of the draft bar or pole of the machine or vehicle being drawn and one horse on the opposite side of the pole. It is more especially designed for grain harvesters or binders, the three horses taking the draft from the inside next to the standing grain, and the other horse on the opposite side of the pole taking the draft from the outside. The object of course is to prevent side draft and to make the work or draft alike on all four horses.

The invention is intended as an improvement upon the four-horse equalizers patented to me on January 12, 1886, and November 23, 1886, numbered, respectively, 334,280 and 353,082, more especially the latter patent of November 23, 1886, and which consists in a combination, with the pole, of levers on opposite sides of the pole adapted to receive draft attachments, a frame fixed to the pole, a yoke fitted adjustably on said frame, a roller journaled to the yoke, and a chain or rope passed over the roller and connected at opposite ends to said levers, which are pivoted to the pole.

The improvement consists in a novel combination of parts, substantially as hereinafter described, and more particularly pointed out in the claim, whereby a more efficient action is secured and one of the levers in the equalizer described in my aforesaid Letters Patent of November 23, 1886, No. 353,082, is dispensed with.

Reference is to be had to the accompanying drawings, forming a part of this specification, in which similar letters of reference indicate corresponding parts in both the figures.

Figure 1:
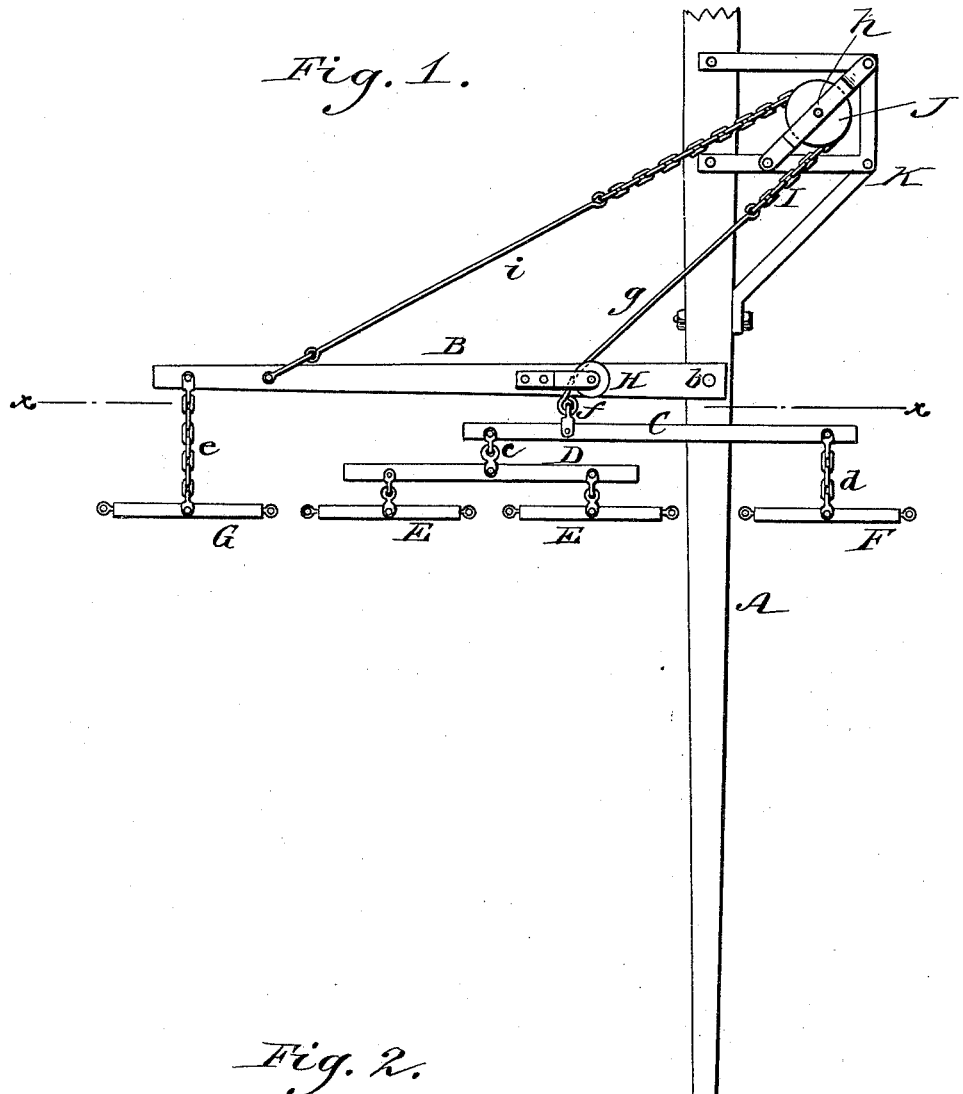
Figure 2:
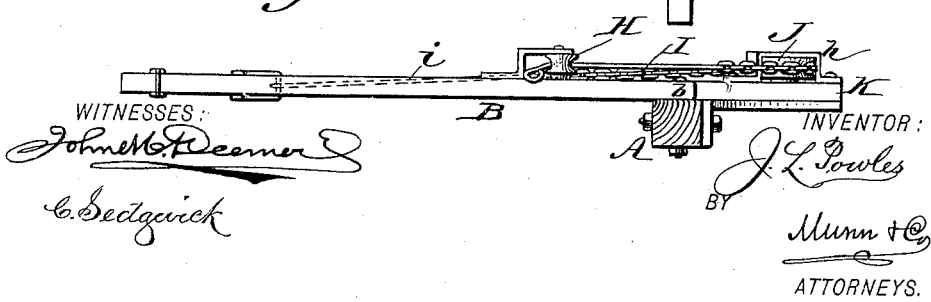

Figure 1 is a plan view of my improved four-horse equalizer with the rear portion of the tongue or pole, which connects with the frame of the machine to which the equalizer is intended to be applied, broken away; and Fig. 2 is a vertical transverse section mainly upon the line $x\ x$ in Fig. 1 and looking backward.

A indicates the tongue or pole of the draft-equalizer, which is to be pivoted in its rear to the frame of the agricultural implement or vehicle to be drawn.

B is a single lever pivoted to the pole at $b$ and arranged to project laterally therefrom on the one or off side of the pole.

C is a three-horse evener crossing the pole unequally on opposite side of it and connected at its farthest projecting portion, as by clevis or links $c$, with the two-horse evener or doubletree D, which has connected with it the singletrees E E for two of the horses next to the off side of the pole. The opposite or outer and shortest projecting portion of this evener C has connected with it, as by a chain $d$, which may be lengthened or shortened as required, the evener F, to which the one horse on the nigh side of the pole is hitched, and the lever B has attached to its free end, as by a chain $e$, the one-horse evener G, to which the off horse of the three on the off side of the pole is to be hitched.

The three-horse evener C is coupled by a clevis $f$ to a draw-rod $g$, that is free to work round a small pulley or rod bearing guide H, carried by a bracket or frame on the lever B at a suitable distance from the pivoted end of the latter. This rod $g$ has attached to it a draw-chain I, which passes around the main or large pulley J, carried by a cross-frame $h$ on a frame K, which, with the main pulley J, is arranged to project from the nigh side of the pole A at a suitable distance back of the lever B, said chain I, after passing around the pulley J, being extended to connect, either directly or through the intervention of a second draw-bar, chain, or rod $i$, with the lever B near its free end, which lever carries the one-horse evener or singletree G. A rope, of course, may be substituted for the chain I. In this way or by this means a most perfect equalizing action, as regards the draft of each horse, may be obtained for the four horses by suitably proportioning the connections and their bearings to give a proportionate leverage, and a strong and durable equalizer is produced, which may be further strengthened by bracing it from its under side.

Having thus described my invention, what I claim as new, and desire to secure by Letters Patent, is—

The combination, with the tongue or pole A, of the lever $b$, pivoted thereto, a three-horse evener C, crossing the pole unequally on opposite sides of it and pivotally connected at the end of the farther projecting portion with the doubletree D, having the whiffletrees E E connected thereto, the singletree F, connected by means of a chain with the shorter extending portion of evener C, the singletree G, connected by means of a chain with the outer end of the lever B, the draw-rod $g$ and pulley H, around which the draw-rod passes, chain I and pulley J, around which the chain passes, said pulley being journaled between diagonal braces in a rectangular frame, said frame being suitably braced, and the draw-bar $i$, connected with the chain I and free end of the lever B, all arranged and adapted to operate substantially as shown and described.

JOHN L. POWLES.

Witnesses:
   HIRAM BURGESS,
   WM. H. TOWNSEND.